United States Patent
Kobayashi et al.

(10) Patent No.: US 8,874,314 B2
(45) Date of Patent: Oct. 28, 2014

(54) VEHICLE DAMPING CONTROL APPARATUS

(75) Inventors: Yosuke Kobayashi, Yokohama (JP); Mitsunori Ohta, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 88 days.

(21) Appl. No.: 13/700,659

(22) PCT Filed: May 16, 2011

(86) PCT No.: PCT/IB2011/001053
§ 371 (c)(1),
(2), (4) Date: Nov. 28, 2012

(87) PCT Pub. No.: WO2011/151689
PCT Pub. Date: Dec. 8, 2011

(65) Prior Publication Data
US 2013/0080013 A1    Mar. 28, 2013

(30) Foreign Application Priority Data
May 31, 2010    (JP) ................. 2010-123776

(51) Int. Cl.
G06F 17/00    (2006.01)
G06F 19/00    (2011.01)
(Continued)

(52) U.S. Cl.
CPC ........... B60W 30/02 (2013.01); B60W 2540/12 (2013.01); B60T 8/17555 (2013.01); B60G 17/08 (2013.01); B60W 2520/28 (2013.01);
(Continued)

(58) Field of Classification Search
USPC ........... 701/36, 37, 38, 69, 70, 71, 74, 78, 79, 701/82, 83, 84, 88; 340/438, 439, 440, 441; 180/197, 271, 282
See application file for complete search history.

(56) References Cited

U.S. PATENT DOCUMENTS

| | | | |
|---|---|---|---|
| 4,541,051 A | * | 9/1985 | Jarret et al. ............ 701/22 |
| 5,124,917 A | | 6/1992 | Kanamori |

(Continued)

FOREIGN PATENT DOCUMENTS

| | | |
|---|---|---|
| DE | 4015221 | 11/1990 |
| EP | 2078653 | 7/2009 |

(Continued)

OTHER PUBLICATIONS

An English translation of the Japanese Office Action for the corresponding Japanese patent application No. 2010-123776 issued on Nov. 19, 2013.

(Continued)

*Primary Examiner* — Thomas Tarcza
*Assistant Examiner* — Edward Pipala
(74) *Attorney, Agent, or Firm* — Global IP Counselors, LLP (57) ABSTRACT

A vehicle damping control apparatus is basically provided with a braking/accelerating torque generating component, a corrective torque calculating component, a corrective torque command value output component and a priority level setting component. The braking/accelerating torque generating component is configured to generate braking/accelerating torque in a wheel. The corrective torque calculating component is configured to calculate a corrective torque to suppress vehicle pitching vibration and vehicle bouncing vibration. The corrective torque command value output component is configured to output a corrective torque command value to the braking/accelerating torque generating component based on the corrective torque. The priority level setting component is configured to set a priority level for calculating the corrective torque command value such that vehicle bouncing vibration is suppressed with priority over vehicle pitching vibration.

4 Claims, 5 Drawing Sheets

| | PITCHING | BOUNCING |
|---|---|---|
| BRAKING/ACCELERATING TORQUE FLUCTUATION | $Kt\_p = -0.3$ | $Kt\_b = 0.6$ |
| LONGITUDINAL DISTURBANCE | $Ks\_p = -0.2$ | $Ks\_b = 0.4$ |

(51) Int. Cl.
  *B60R 21/0132* (2006.01)
  *B60T 8/1755* (2006.01)
  *B60G 17/08* (2006.01)
  *B60W 10/188* (2012.01)
  *B60W 10/04* (2006.01)
  *B60W 30/02* (2012.01)
  *B60W 10/18* (2012.01)
  *B60W 10/06* (2006.01)
  *B60W 30/20* (2006.01)
  *B60W 50/08* (2012.01)

(52) U.S. Cl.
  CPC ......... *B60G 2400/39* (2013.01); *B60W 10/188* (2013.01); *B60W 10/04* (2013.01); *B60W 2720/16* (2013.01); *B60W 2710/0666* (2013.01); *B60G 2500/10* (2013.01); *B60G 2400/208* (2013.01); *B60W 2540/10* (2013.01); *B60G 2400/33* (2013.01); *B60W 10/18* (2013.01); *B60W 10/06* (2013.01); *B60W 2710/182* (2013.01); *B60W 30/20* (2013.01); *B60W 50/087* (2013.01)
  USPC .................. 701/38; 701/70; 701/79; 180/282

(56) References Cited

U.S. PATENT DOCUMENTS

| | | | |
|---|---|---|---|
| 5,193,845 A | 3/1993 | Yokote et al. | |
| 8,082,081 B2 * | 12/2011 | Matsumoto et al. | 701/48 |
| 8,229,642 B2 * | 7/2012 | Post et al. | 701/91 |
| 8,380,381 B2 * | 2/2013 | Ichinose et al. | 701/22 |
| 8,706,338 B2 * | 4/2014 | Ichinose et al. | 701/22 |
| 2008/0249689 A1 * | 10/2008 | Matsumoto et al. | 701/48 |
| 2008/0249690 A1 * | 10/2008 | Matsumoto et al. | 701/48 |
| 2010/0211278 A1 * | 8/2010 | Craig et al. | 701/70 |

FOREIGN PATENT DOCUMENTS

| | | |
|---|---|---|
| JP | 63-251318 A | 10/1988 |
| JP | 4-87815 A | 3/1992 |
| JP | 7-52628 A | 2/1995 |
| JP | 2007-161032 | 6/2007 |
| JP | 2009-40163 A | 2/2009 |
| JP | 2009113517 A | 5/2009 |
| JP | 2009273275 A | 11/2009 |

OTHER PUBLICATIONS

International Search Report of PCT/IB2011/001053 dated May 11, 2012, mailed May 24, 2012.
An English translation of the Chinese Office Action for the corresponding Chinese patent application No. 201180027008.1 issued on Jul. 18, 2014.

* cited by examiner

|  | PITCHING | BOUNCING |
|---|---|---|
| BRAKING/ACCELERATING TORQUE FLUCTUATION | Kt_p=−0.3 | Kt_b=0.6 |
| LONGITUDINAL DISTURBANCE | Ks_p=−0.2 | Ks_b=0.4 |

FIG. 10

VEHICLE DAMPING CONTROL APPARATUS

CROSS-REFERENCE TO RELATED APPLICATIONS

This application is a U.S. National stage of International Application No. PCT/IB2011/001053, filed May 16, 2011. This application claims priority to Japanese Patent Application No. 2010-123776, filed on May 31, 2010. The entire disclosure of Japanese Patent Application No. 2010-123776 is hereby incorporated herein by reference.

BACKGROUND

1. Field of the Invention

The present invention generally relates to a vehicle damping control apparatus adapted to suppress vibrations arising in a vehicle.

2. Background Information

During operation of a vehicle, various vibrations can occur in the vehicle. It is desirable to suppress vibrations arising in a vehicle. One conventional technique for suppressing sprung mass vibrations that occur in a vehicle is disclosed in Japanese Unexamined Patent Application No. 2009-247157. In this publication, accelerating torque and wheel velocity are used as input values to calculate damping torque for the purpose of suppressing sprung mass vibrations.

SUMMARY

It has been discovered that ordinarily, nose diving (i.e., vehicle pitching vibration), whereby a vehicle lunges forward due to the action of turning resistance on the tires, occurs during turning of the vehicle through steering control by the driver. If this nose diving does not proceed smoothly, then the load on the steering wheel may fluctuate. This can result in unstable turning performance. In actual practice, in situations where delay or fluctuation of nose diving due to factors such as friction of the suspension prevents nose diving from taking place smoothly, diminished turning performance has proven to be problem. Specifically, because pitching change and bouncing change caused by braking/accelerating torque fluctuations are not independent, conventional vibration control using simply braking/accelerating torque as disclosed in Japanese Unexamined Patent Application No. 2009-247157 does not afford individual optimal control of both vehicle pitching vibration and vehicle bouncing vibration, and does not afford improved turning performance.

With the foregoing problem in view, one object presented in this disclosure is to provide a vehicle damping control apparatus for a vehicle which affords improved turning performance.

In view of the state of the known technology, one proposal of this disclosure is to provide a vehicle damping control apparatus that basically comprises a braking/accelerating torque generating component, a corrective torque calculating component, a corrective torque command value output component and a priority level setting component. The braking/accelerating torque generating component is configured to generate braking/accelerating torque in a wheel. The corrective torque calculating component is configured to calculate a corrective torque to suppress vehicle pitching vibration and vehicle bouncing vibration. The corrective torque command value output component is configured to output a corrective torque command value to the braking/accelerating torque generating component based on the corrective torque. The priority level setting component is configured to set a priority level for calculating the corrective torque command value such that vehicle bouncing vibration is suppressed with priority over vehicle pitching vibration.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
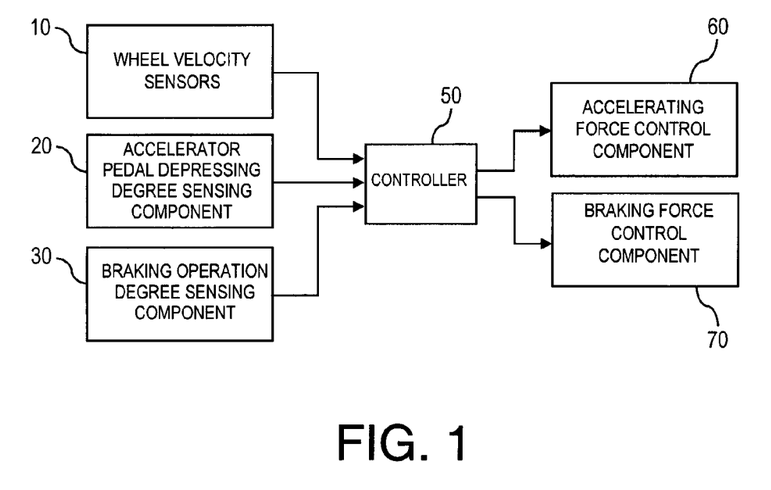
FIG. 1 is a system diagram showing an overall configuration of a vehicle damping control apparatus in accordance with an illustrated embodiment.
Figure 2:
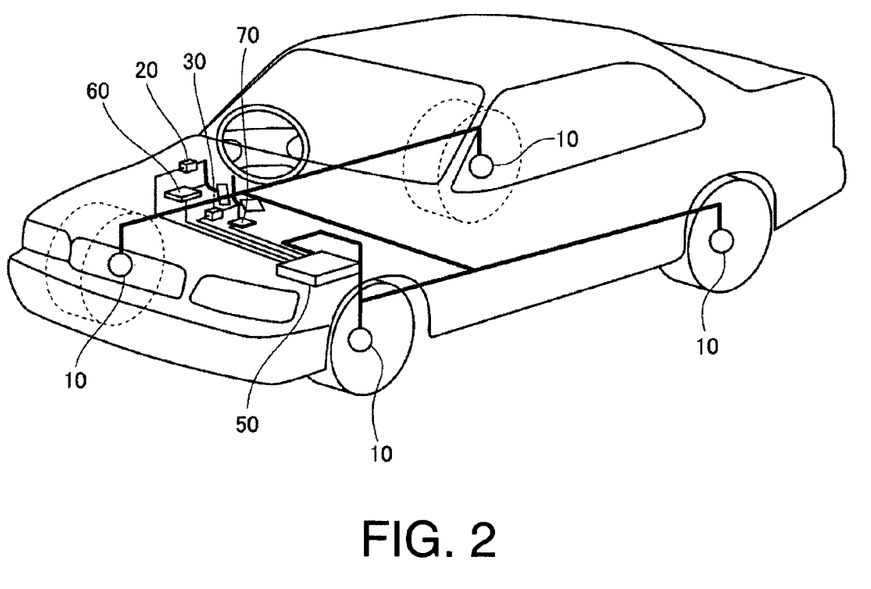
FIG. 2 is a configuration diagram of a vehicle equipped with the vehicle damping control apparatus in accordance with the illustrated embodiment.

Referring initially to FIG. 1, a system diagram of a vehicle damping control apparatus is illustrated in accordance with one illustrated embodiment. FIG. 2 is a configuration diagram of a vehicle equipped with the vehicle damping control apparatus.

Wheel velocity sensors 10 sense the respective velocity of each of the wheels from the rotation velocity of the wheels. An accelerator pedal depressing degree sensing component 20 senses the accelerator (throttle) opening APO which represents the degree to which the accelerator pedal is depressed by the driver. A braking operation degree sensing component 30 senses a braking operation degree S_b (the brake pedal stroke degree, pedal force, etc.) made by the driver.

Figure 7:
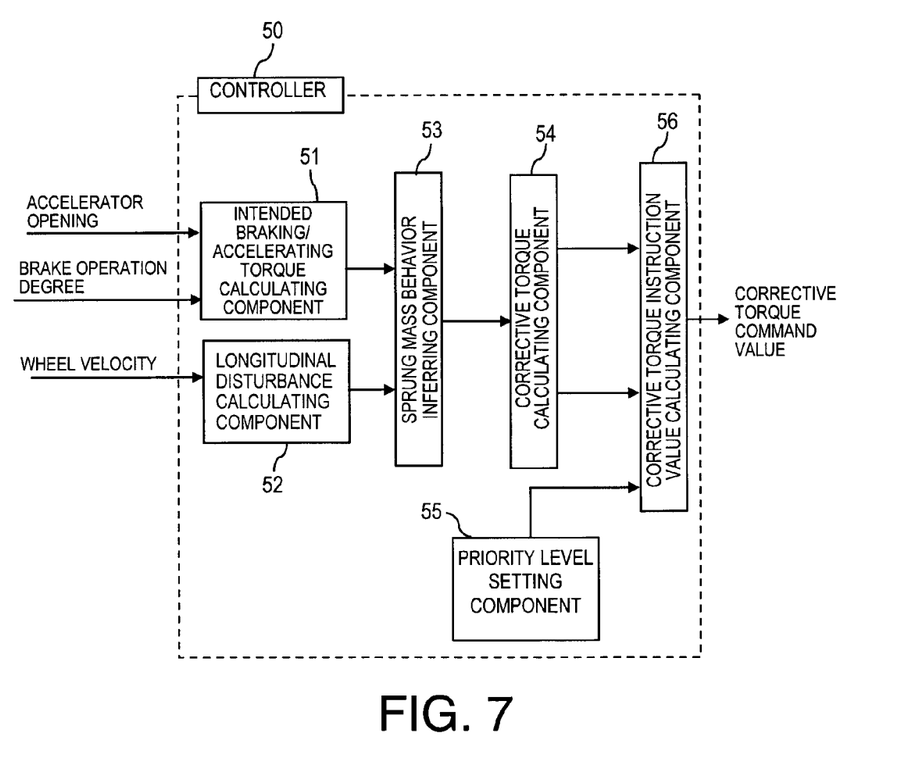
FIG. 7 is a block diagram showing processes performed by a controller in the vehicle damping control apparatus in accordance with the illustrated embodiment.

Based on state quantities sensed by each of the sensors, an engine controller 50 outputs control signals to the actuator of the vehicle damping control apparatus, namely, an accelerating force control component 60 and a braking force control component 70. As seen in FIG. 7, the engine controller 50 includes an intended braking/accelerating torque calculating component 51, a disturbance calculating component 52, a sprung mass behavior inferring component 53, a corrective torque calculating component 54, a priority level setting component 55 and a corrective torque command value calculating component 56. Based on the accelerator opening APO input from the accelerator pedal depressing degree sensing component 20 and the braking operation degree S_b input from the braking operation degree sensing component 30, the intended braking/accelerating torque calculating component 51 of the controller 50 calculates the braking/accelerating torque intended by the driver (e.g., intended braking/accelerating torque Te_a, Twb). Also, based on the wheel velocity of individual wheels input from each of the wheel velocity sensors 10, the longitudinal disturbance calculating component 52 of the controller 50 calculates, from changes in the velocity of each wheel, disturbance acting in the longitudinal direction on the tires. The controller 50 then outputs a corrective torque command value, which the controller 50 has calculated, to the accelerating force control component 60 and the braking force control component 70.

Figure 3:
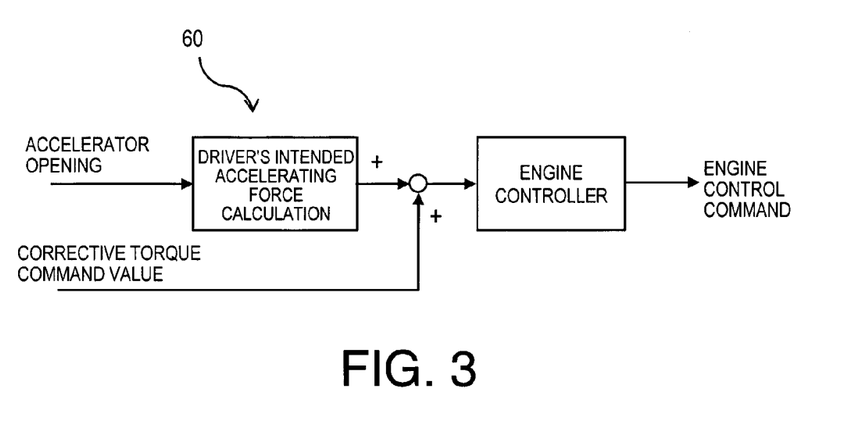
FIG. 3 is a block diagram representing a control configuration of an accelerating force control component of the illustrated embodiment.

FIG. 3 is a block diagram representing a control configuration of the accelerating force control component 60 of the first embodiment. The accelerating force control component 60 calculates a control command for the engine. In accordance with the accelerator opening APO, driver's intended accelerating torque is calculated, and the corrective torque command value output from the controller 50 is added to the driver's intended accelerating torque to calculate a target accelerating torque, whereupon an engine controller calculates an engine control command in accordance with the target accelerating torque.

Figure 4:
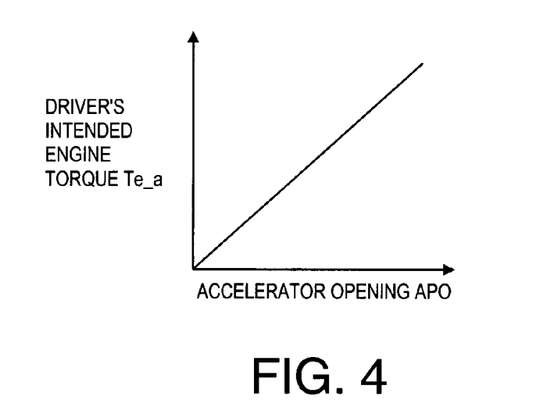
FIG. 4 is a simplified map representing driver's intended engine torque characteristics in accordance with the illustrated embodiment.

FIG. 4 is a simplified map representing driver's intended engine torque characteristics. As shown in FIG. 4, driver's intended accelerating torque is calculated through conversion of driver's intended engine torque, which has been read out from a characteristics map that defines the relationship between accelerator opening APO and driver's intended engine torque Te_a, to the drive shaft end with reference to the differential gear ratio or the transmission gear ratio of an automatic shift.

Figure 5:
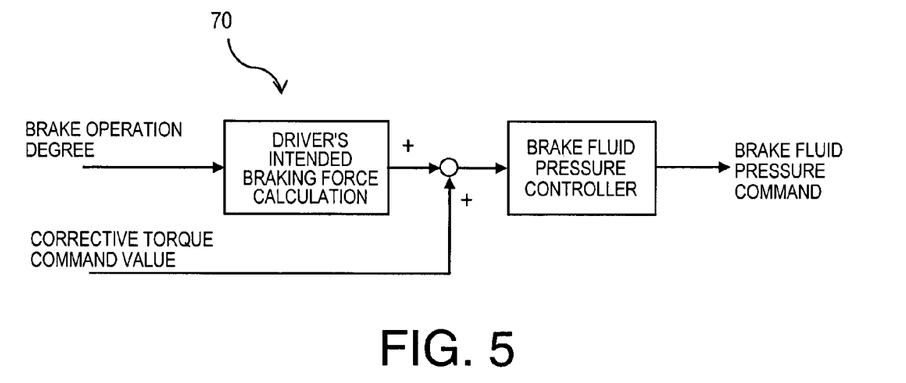
FIG. 5 is a block diagram representing a control configuration of a braking force control component in accordance with the illustrated embodiment.
Figure 6:
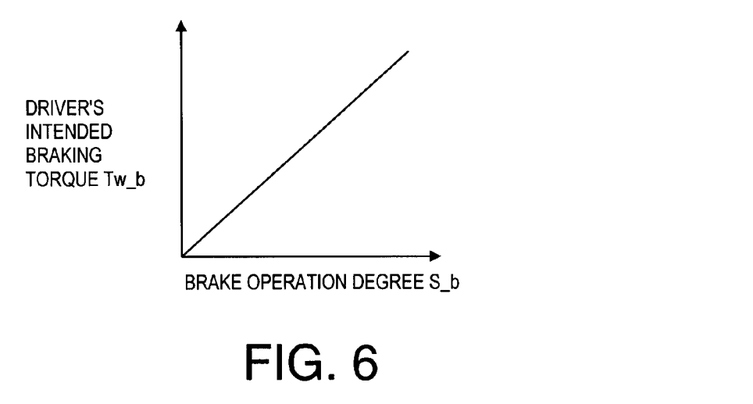
FIG. 6 is a simplified map representing driver's intended braking torque characteristics in accordance with the illustrated embodiment.

FIG. 5 is a block diagram representing a control configuration of a braking force control component 70. The braking force control component 70 outputs a brake fluid pressure command. Driver-intended braking torque Tw_b is calculated in accordance with brake pedal operation degree S_b; a separately input corrective torque command value is added to the driver's intended braking torque Tw_b to calculate target braking torque; and a brake fluid pressure controller outputs a brake fluid pressure command in accordance with the target braking torque. FIG. 6 is a map representing driver's intended braking torque characteristics. As shown in FIG. 6, driver's intended braking torque is calculated by reading out from a characteristics map that defines the relationship between brake pedal operation degree S_b and driver's intended braking torque.

FIG. 7 is a block diagram showing processes performed by the controller 50 in the vehicle damping control apparatus of the first embodiment. The intended braking/accelerating torque calculating component 51 inputs signals from the accelerator pedal depressing degree sensing component 20 and the braking operation degree sensing component 30, and calculates the braking/accelerating torque intended by the driver. Based on the wheel velocity of each of the wheels as input from the wheel velocity sensors 10, the longitudinal disturbance calculating component 52 calculates from change in each of the wheel velocities the disturbance acting in the longitudinal direction on the tires. The sprung mass behavior inferring component 53 infers a vehicle sprung mass behavior from the intended braking/accelerating torque which was calculated by the intended braking/accelerating torque calculating component 51, and the longitudinal disturbance that was calculated by the longitudinal disturbance calculating component 52.

The priority level setting component 55 sets suppression levels for the sprung mass pitching vibration and the bouncing vibration which were inferred from the intended braking/accelerating torque and longitudinal disturbance. The setting method in this priority level setting component 55 is a characteristic feature that will be discussed in detail later. The corrective torque calculating component 54 calculates corrective torque sufficient to suppress each of the types of vehicle sprung mass vibration that were inferred from the intended braking/accelerating torque and longitudinal disturbance by the sprung mass behavior inferring component 53. The corrective torque command value calculating component 56 calculates a corrective torque command value based on corrective torque when the intended braking/accelerating torque calculated by the corrective torque calculating component 54 was input, corrective torque when longitudinal disturbance was input, and the priority level that was set by the priority level setting component 55.

Figure 8:
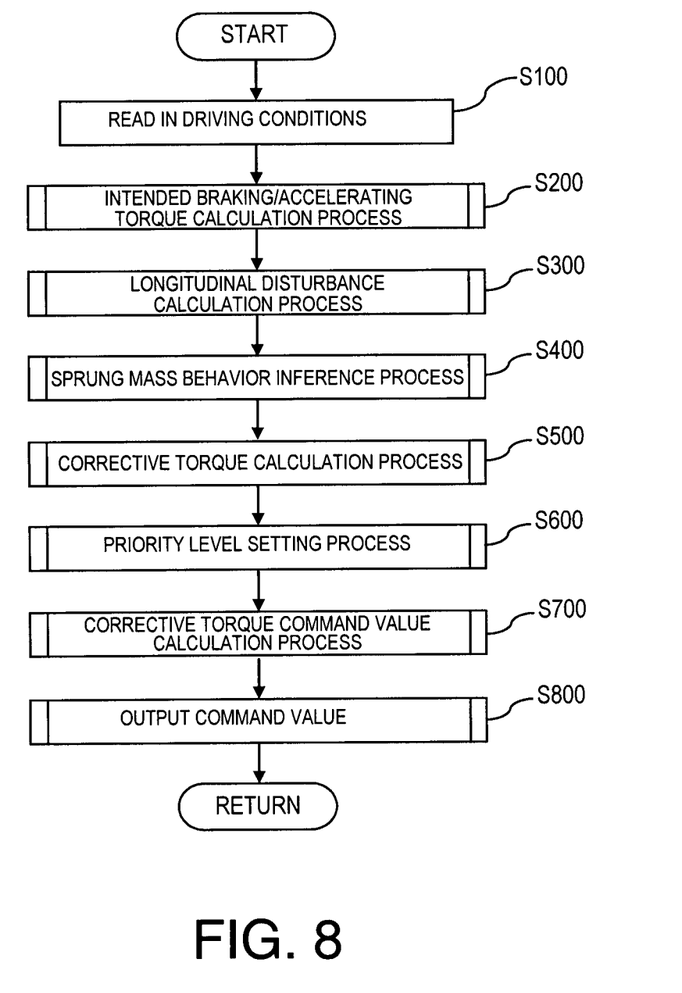
FIG. 8 is a flowchart showing a process routine of a damping control process in the controller in accordance with the illustrated embodiment.
Figure 9:
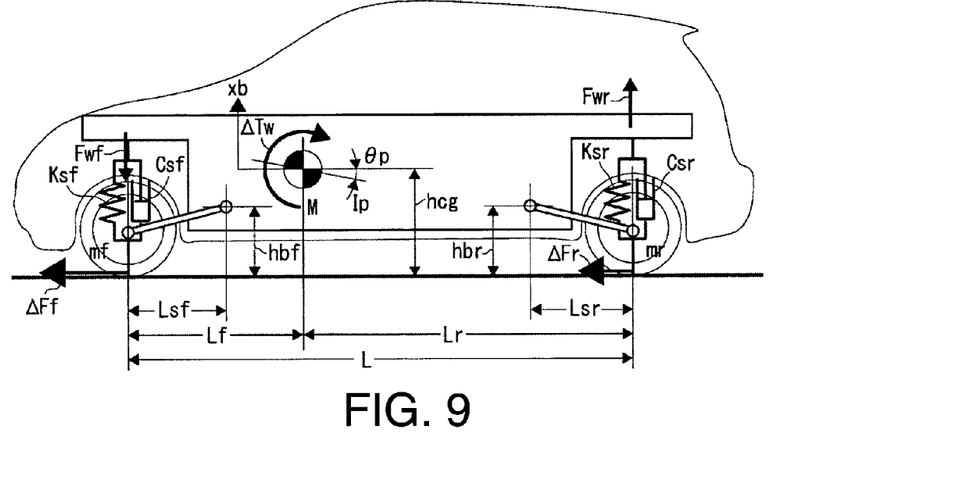
FIG. 9 is a simplified diagram representing a vehicle movement model in accordance with the illustrated embodiment.

Next, the procedure of operating the vehicle damping control apparatus of the illustrated embodiment will be described using FIGS. 8 to 10. FIG. 8 is a flowchart showing a process routine of a damping control process in the controller of the first embodiment. The process content is carried out on a continuous basis at prescribed intervals, for example, every 10 msec.

In Step S100, driving conditions are read into the controller 50. Here, driving conditions refers to information that relates to driver operation status and to driving status of the vehicle. Specifically, the wheel velocity of each of the wheels sensed by the wheel velocity sensors 10, the accelerator opening APO sensed by the accelerator pedal depressing degree sensing component 20, and the braking operation degree S_b sensed by the braking operation degree sensing component 30 are read into the controller 50.

In Step S200, based on the driver operation status that was read in Step S100, the driver's intended braking/accelerating torque Tw is calculated as follows. From the accelerator opening APO, the driver's intended engine torque Te_a is read based on the characteristics map defining the relationship between accelerator opening and driver's intended engine torque as shown in FIG. 4, e.g., Te_a=map (APO). The driver's intended engine torque Te_a which has been read out is converted to drive shaft torque based on the differential gear ratio Kdif or the gear ratio Kat of an automatic shift, and the driver's intended accelerating torque Tw_a is calculated as follows:

$$Tw\_a = (1/(Kdf \cdot Kat)) \cdot Te\_a$$

Analogously, driver's intended braking torque Tw_b is calculated from brake pedal operation degree S_b, from the characteristics map defining the relationship between brake operation degree and driver's intended braking torque as shown in FIG. 6. From the driver's intended accelerating torque Tw_a and the driver's intended braking torque Tw_b calculated in this way, the intended braking/accelerating torque Tw is calculated according to the following formula (corresponds to the braking/accelerating torque sensing means): Tw=Tw_a−Tw_b In Step S300, based on the wheel velocity of each of the wheels read in Step S100, longitudinal disturbance is calculated for input to the movement model discussed later. Here, longitudinal disturbance refers to forces input to each of the wheels from the road surface, and can be calculated as follows.

After eliminating the actual vehicle velocity component Vbody from the wheel velocity $Vw_{FR}$, $Vw_{FL}$, $Vw_{RR}$, $Vw_{RL}$ of each of the wheels to calculate velocity of each wheel with respect to the body, the differential of each wheel velocity and the previous value of each wheel velocity is derived, and acceleration speed of each wheel is calculated through temporal differentiation. By multiplying the unsprung mass by the each of the wheel acceleration speeds so calculated, longitudinal disturbance $\Delta Ff$, $\Delta Fr$ is calculated for the front and rear wheels.

Next, in Step S400, sprung mass behavior is inferred from the intended braking/accelerating torque Tw that was calculated in Step S200 and from the longitudinal disturbance $\Delta Ff$, $\Delta Fr$ that was calculated in Step S300.

The description turns first to the movement model in the first embodiment. FIG. 9 is a simplified diagram representing a vehicle movement model. This vehicle movement model is a front/rear 2-wheel model having front and back suspensions on the body. Specifically, the vehicle movement model is provided with the parameters of (1) a braking/accelerating torque fluctuation $\Delta Tw$ arising in the vehicle; (2) a longitudinal disturbance $\Delta Ff$ arising in the front wheel in response to a change in road surface conditions, a change in braking/accelerating force, or steering control, etc.; and (3) a longitudinal disturbance $\Delta Fr$ arising in the rear wheel. The model is composed of a suspension model having a spring damper system of a suspension corresponding to one wheel among the front and rear wheels, and a body sprung mass model representing displacement of the position of the center of gravity of the body.

Next, a vehicle movement model will be used to describe a situation in which a fluctuation of the braking/accelerating torque arising in the vehicle has arisen, and the longitudinal disturbance has arisen due to the tires being subjected to at least one of a change in road surface conditions, a change in braking/accelerating force and steering control. When at least one of the braking/accelerating torque fluctuation $\Delta Tw$ and the longitudinal disturbance $\Delta Ff$, $\Delta Fr$ has arisen in the body, the body experiences rotation of angle $\theta p$ about the axis of pitch and the vertical displacement xb of the position of the center of gravity. Here, the braking/accelerating torque fluctuation $\Delta Tw$ is computed from the differential of braking/accelerating torque $\Delta Tw_n$ calculated from a driver accelerating operation or braking operation, and the previous value of braking/accelerating torque $\Delta Tw_{n-1}$.

The spring constant and damping constant of the front wheel suspension are denoted as Ksf, Csf. The spring constant and the damping constant of the rear wheel suspension are denoted as Ksr, Csr. The link length and link center height of the front wheel suspension are denoted as Lsf, hbf. The link length and link center height of the rear wheel suspension are denoted as Lsr, hbr. The pitch direction moment of inertia of the body is denoted as Ip. The distance between the front wheel and the axis of pitch is denoted as Lf. The distance between the rear wheel and the axis of pitch is denoted as Lr, the height of the center of gravity is denoted as hcg. The sprung mass is denoted as M. Herein, for convenience in notation, when the parameters are represented in vector notation, in some instances temporal differentiation d (parameter)/dt is denoted by a black circle over the parameter. The meaning is completely the same, however.

In this case, the equation of motion of vertical vibration of the body can be represented as $$M \cdot (d^2 xb/dt) = \\ -Ksf(xb + Lf \cdot \theta p) - Csf(dxb/dt + Lf \cdot d\theta p/dt) - Ksr(xb - Lr \cdot \theta p) - \\ Csf(dxb/dt - Lr \cdot d\theta p/dt) - (hbf/Lsf)\Delta Ff + (hbr/Lsr)\Delta Fr$$

The equation of motion of pitching vibration of the body can be represented as $$Ip \cdot (d^2 \theta p/dt^2) = \\ -Lf \cdot Ksf(xb + Lf \cdot \theta p) - Lf \cdot Csf(dxb/dt + Lf \cdot d\theta p/dt) + \\ Lr \cdot Ksr(xb - Lr \cdot \theta p) + Lr \cdot Csf(dxb/dt - Lr \cdot d\theta p/dt) - \\ \{hcg - (Lf - Lsf)hbf/Lsf\}\Delta Ff + \{hcg - (Lr - Lsr)hbr/Lsr\}\Delta Fr$$

Transforming these two equations of motion to an equation of state wherein $x_1$=xb, $x_2$=dxb/dt, $x_3$=$\theta p$, $x_4$=$d\theta p/dt$ results in dx/dt=Ax+Bu.

Here, the respective elements are expressed by Equation (1):

$$A = \begin{bmatrix} 0 & 1 & 0 & 0 \\ ab1 & ab2 & ab3 & ab4 \\ 0 & 0 & 1 & 0 \\ bb1 & bb2 & bb3 & bb4 \end{bmatrix}, B = \begin{bmatrix} 0 & 0 & 0 \\ p1 & p2 & 0 \\ 0 & 0 & 0 \\ p3 & p4 & q \end{bmatrix}, x = \begin{bmatrix} xb \\ \dot{x}b \\ \theta p \\ \dot{\theta} p \end{bmatrix}, \quad (1)$$

$$u = \begin{bmatrix} \Delta Ff \\ \Delta Fr \\ \Delta Tw \end{bmatrix}$$

$$ab1 = -(Ksf + Ksr)/M$$

$$ab2 = -(Csf + Csr)/M$$

$$ab3 = -(Lf \cdot Ksf - Lr \cdot Ksr)/M$$

$$ab4 = -(Lf \cdot Csf - Lr \cdot Csr)/M$$

$$bb1 = -(Lf \cdot Ksf - Lr \cdot Ksr)/Ip$$

$$bb2 = -(Lf \cdot Csf - Lr \cdot Csr)/Ip$$

$$bb3 = -(Lf^2 \cdot Ksf + Lr^2 \cdot Ksr)/Ip$$

$$bb4 = -(Lf^2 \cdot Csf + Lr^2 \cdot Csr)/Ip$$

$$p1 = -hbf/M/Lsf$$

$$p2 = hbf/M/Lsr$$

$$p3 = hcg/Ip - (Lf - Lsf)hbf/Lsf/Ip$$

$$p4 = hcg/Ip - (Lr - Lsr)hbr/Lsr/Ip$$

$$q = 1/Ip$$

Further, splitting the above equation of state by input signal into a feed forward (F/F) term with braking/accelerating torque as input, and a feedback (F/B) term with driving disturbance of the front and rear wheels as input, the feed forward term can be represented as Equations (2) below:

$$\dot{x} = Ax + B_{FF} \cdot \Delta Tw, B_{FF} = \begin{bmatrix} 0 \\ 0 \\ 0 \\ q \end{bmatrix}. \quad (2)$$

The feedback can be represented as Equations (3):

$$\dot{x} = Ax + B_{FB} \cdot \begin{bmatrix} \Delta Ff \\ \Delta Fr \end{bmatrix}, B_{FB} = \begin{bmatrix} 0 & 0 \\ p1 & p2 \\ 0 & 0 \\ p3 & p4 \end{bmatrix} \quad (3)$$

By deriving x, the vehicle sprung mass behavior can be inferred from the braking/accelerating torque fluctuation $\Delta Tw$ and the longitudinal disturbance $\Delta Ff$, $\Delta Fr$.

In Step S500, based on the sprung mass behavior that was inferred in Step S400, a corrective torque dTw* sufficient to suppress body vibration is calculated. The process performed in this Step S500 is described below. The corrective torque dTw* for feedback to the intended braking/accelerating torque is calculated for the fluctuation component $\Delta Tw$ of the intended braking/accelerating torque Tw that was calculated in Step S200, and for the longitudinal disturbance $\Delta Ff$, $\Delta Fr$ of the front and rear wheels, from the respective sprung mass behavior x thereof.

At this time, feedback gain is determined such that dxb/dt and dθp/dt vibration is minimal. For example, in the case of calculating a feedback gain such that dxb/dt in the feedback term is minimal, there is selected a weighting matrix such as Equations (4):

$$Q_{xb\_FB} = \begin{bmatrix} 1 & 0 & 0 & 0 \\ 0 & 3e10 & 0 & 0 \\ 0 & 0 & 1 & 0 \\ 0 & 0 & 0 & 1 \end{bmatrix}, R_{xb\_FB} = \begin{bmatrix} 1 & 0 \\ 0 & 1e15 \end{bmatrix} \quad (4)$$

Then, the control input will minimize J in Equation (5) as follows:

$$J = \int_0^{\infty} (x^T(t) Q_{xb\_FB} x(t) + u^T(t) R_{xb\_FB} u(t)) dt \quad (5)$$

Based on the positive symmetric solution p of the Ricatti algebraic Equation (6) as follows:

$$A^T p + pA - pBR_{xb\_FB}^{-1} B^T p + Q_{xb\_FB} = 0 \quad (6)$$

The solution is given by Equations (7) as follows:

$$u(t) = -F_{xb\_FB} x(t), F_{xb\_FB} = R_{xb\_FB} B^T p \quad (7)$$

Here, $F_{xb\_FB}$ is a feedback gain matrix relating to dxb/dt in the feedback term.

Likewise, a feedback gain $F_{thp\_FB}$ can be calculated such that dθp/dt vibration in the feedback term is minimal, and a feedback gain $F_{xb\_FF}$, $F_{thp\_FF}$ such that dxb/dt and dθp/dt in the feed forward term is minimal.

By establishing a weighting matrix using Equations (8)

$$Q_{thp\_FB} = \begin{bmatrix} 1 & 0 & 0 & 0 \\ 0 & 1 & 0 & 0 \\ 0 & 0 & 1 & 0 \\ 0 & 0 & 0 & 5e10 \end{bmatrix}, R_{thp\_FB} = \begin{bmatrix} 1 & 0 \\ 0 & 1e15 \end{bmatrix} \quad (8)$$

the feedback gain $F_{thp\_FB}$ such that dθp/dt vibration in the feedback term is minimal can be calculated as Equation (9) below:

$$F_{thp\_FB} = R_{thp\_FB} B^T p \quad (9)$$

Analogously, by establishing a weighting matrix as in Equation (10) below:

$$Q_{xb\_FF} = \begin{bmatrix} 1 & 0 & 0 & 0 \\ 0 & 1e9 & 0 & 0 \\ 0 & 0 & 1 & 0 \\ 0 & 0 & 0 & 1 \end{bmatrix}, R_{xb\_FF} = [1] \quad (10)$$

a feedback gain $F_{xp\_FF}$ such that dxb/dt in the feed forward term is minimal can be calculated as Equation (11):

$$F_{xb\_FF} = R_{xb\_FF} B^T p \quad (11)$$

Also, by establishing a weighting matrix as in Equation (12) below:

$$Q_{thp\_FF} = \begin{bmatrix} 1 & 0 & 0 & 0 \\ 0 & 1 & 0 & 0 \\ 0 & 0 & 1 & 0 \\ 0 & 0 & 0 & 1e9 \end{bmatrix}, R_{thp\_FF} = [1] \quad (12)$$

a feedback gain $F_{xb\_FF}$ such that dxb/dt and dθp/dt in the feed forward term is minimal can be calculated as Equation (13) below:

$$F_{thp\_FF} = R_{thp\_FF} B^T p \quad (13)$$

In this as Equation (13), $F_{thp\_FF}$ and $F_{xb\_FF}$ correspond to first corrective torque, and $R_{thp\_FB}$ and $F_{xb\_FB}$ correspond to second corrective torque. The present step constitutes the corrective torque calculating component 54, and corresponds to the first corrective torque computing component and the second corrective torque computing component. While this is the optimal regulator method, other methods, such as pole assignment, can be designed as well.

Figure 10:
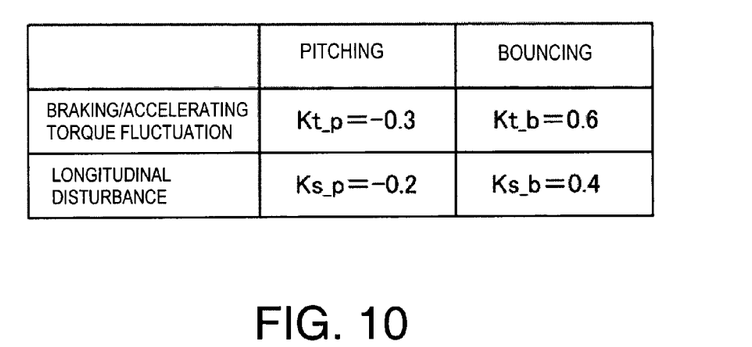
FIG. 10 is a priority level map showing priority levels in accordance with the illustrated embodiment.

In Step S600, for body sprung mass behavior inferred from the braking/accelerating torque fluctuation $\Delta Tw$ and from the longitudinal disturbance $\Delta Ff$, $\Delta Ff$ in Step S400, i.e., rotation angle θp about the axis of pitch and vertical displacement xb of the position of the center of gravity, respective priority levels are set from a map like that shown in FIG. 10. FIG. 10 is a priority level map showing priority levels in the first embodiment used by the priority level setting component 55. Here, larger priority level values indicate higher priority levels. Also, the priority level values indicate a direction that suppresses vibration in the case of a positive value, and a direction that excites vibration in the case of a negative value. As will be understood from the priority map, a greater priority level is set for vehicle bouncing vibration than for vehicle pitching vibration, and the priority level of vehicle bouncing vibration with respect to vehicle pitching vibration is set such that braking/accelerating torque fluctuation has priority over longitudinal disturbance. By setting priority levels in this way, stable turning performance can be achieved, and acceleration/deceleration feel during acceleration/deceleration can be achieved without impairing ride comfort any more than necessary.

In Step S700, based on the corrective torque calculated in Step S500 and the priority level set in Step S600, a corrective torque command value dTw* is calculated as follows: $dTw^* = Kt\_p \cdot F_{thp\_FF} + Kt\_b \cdot F_{xb\_FF} + KS\_P \cdot R_{thp\_FB} + KS\_b \cdot F_{xb\_FB}$ Here, Kt_p represents the pitching priority level with respect to braking/accelerating torque fluctuation, Kt_b represents the bouncing priority level with respect to braking/accelerating torque fluctuation, Ks_p represents the pitching priority level with respect to longitudinal disturbance, and Ks_b represents the bouncing priority level with respect to longitudinal disturbance.

In Step S800, the corrective torque command value dTw* that was calculated in Step S700 is output to the accelerating force control component 60 and the braking force control component 70, whereupon the current process terminates.

Now an action based on priority level settings will be discussed. Ordinarily, when the driver steers in order to turn, forward lunging (nose diving) of the body occurs due to turning resistance that acts on the tires. If this nose diving does not proceed smoothly, the load on the steering wheel may fluctuate and stable turning performance may not be possible. In actual practice, nose diving may be delayed or fluctuate due to factors such as friction of the suspension. Moreover, if considerable pitching vibration of the body arises during driving, there may be considerable shifting of the driver's line of sight, and poor ride comfort or fatigue may result as well.

Accordingly, in the illustrated embodiment, priority levels which represent levels of suppression are determined for vehicle pitching vibrations and vehicle bouncing vibrations, in a manner giving greater priority to suppression of vehicle bouncing vibrations over suppressing vehicle pitching vibrations. Further, the priority levels are set such that the priority levels when calculating corrective torque for suppressing vehicle vibration due to braking/accelerating torque give greater priority to suppression of vehicle bouncing vibration, as compared to the priority levels when calculating corrective torque for suppressing vehicle vibration due to wheel velocity. Therefore, nose diving arising during steering, specifically, suppression of pitching vibration to a greater extent than bouncing vibration, is prevented, and stable turning performance can be achieved.

Moreover, for body vibration resulting from an acceleration or deceleration operation by the driver, further suppression of vehicle pitching vibration to a greater extent than vehicle bouncing vibration is prevented, so that the driver can feel the acceleration or deceleration. Additionally, in scenarios where fluctuations in wheel velocity arise due to disturbances from the road surface such as may be encountered when driving on bad roads, suppression of vehicle pitching vibration takes place to a greater extent than during acceleration or deceleration operations by the driver, and therefore ride comfort can be improved.

Also, in addition to suppressing the vehicle bouncing vibration, the vehicle pitching vibration is excited. Therefore, nose diving that arises during steering takes place rapidly, and more stable turning performance is achieved. Also, pitching vibration can be achieved with stable turning performance. Also, because pitching vibration arises during driver acceleration and deceleration operations as well, the driver can better feel acceleration and deceleration. Additionally, pitching is not excited any more than necessary when driving on bad roads or the like, and impaired ride comfort performance can be prevented.

As described above, the illustrated embodiment can afford the working effects recited below.

As mentioned above, the vehicle damping control apparatus of the illustrated embodiment is provided with several components to give priority of the suppression of vehicle bouncing vibration over suppression of pitching vibration. In particular, the vehicle damping control apparatus is provided with the accelerating force control component 60 and the braking force control component 70 for generating braking/accelerating torque in the wheels (collectively referred to as a braking/accelerating torque generating component). The vehicle damping control apparatus is provided with the corrective torque calculating component 54 for calculating a corrective torque to suppress pitching vibration and bouncing vibration of the vehicle. The vehicle damping control apparatus is also provided with the corrective torque command value output component 56 for outputting a corrective torque command value dTw* to the braking/accelerating torque generating component based on the corrective torque. Finally, the vehicle damping control apparatus is also provided with priority level setting component 55 for setting priority levels for the purpose of calculating a corrective torque command value in such a way that bouncing vibration is suppressed with priority over pitching vibration of the vehicle. Therefore, because suppression of bouncing vibration takes place with priority over suppression of pitching vibration, nose diving takes place smoothly, and stable turning performance can be achieved.

Moreover, in the vehicle damping control apparatus of the illustrated embodiment, the intended braking/accelerating torque calculating component 51 (also referred to as a braking/accelerating torque sensing component) for sensing the vehicle braking/accelerating torque that is intended by the driver, and the wheel velocity sensors 10 (also referred to as a wheel velocity sensing component) for sensing rotation speed of the wheels are provided. Also the corrective torque calculating component 54 includes the first corrective torque computing component for computing a first corrective torque ($F_{thp\_FF}$ and $F_{xb\_FF}$) to suppress vehicle pitching vibration and vehicle bouncing vibration of the vehicle based on the braking/accelerating torque, and the second corrective torque computing component for computing a second corrective torque ($R_{thp\_FB}$ and $F_{xb\_FB}$) to suppress pitching vibration and bouncing vibration of the vehicle based on wheel velocity (see Step S500). In addition, the corrective torque command value output component 56 is a component for computing a corrective torque command value dTw* based on the first corrective torque ($F_{thp\_FF}$ and $F_{xb\_FF}$), the second corrective torque ($R_{thp\_FB}$ and $F_{xb\_FB}$), and the priority level (Kt_p, Kt_b, Ks_p, Ks_b). Finally, the priority level setting component 55 preferably sets the priority level (Kt_p, Kt_b) in the first corrective torque such that bouncing vibration is suppressed with priority over pitching vibration, as compared with the priority level (Ks_p, Ks_b) in the second corrective torque.

Therefore, nose diving, specifically, pitching vibration that arises during steering is not suppressed to a greater extent than vehicle bouncing vibration, and stable turning performance can be achieved. Also, with respect to body vibration produced by a driver acceleration or deceleration operation, further suppression of vehicle pitching vibration to a greater extent than vehicle bouncing vibration is prevented, whereby the driver can feel the acceleration or deceleration. Additionally, in scenarios where fluctuations in wheel velocity arise due to disturbances from the road surface such as may be encountered when driving on bad roads, suppression of pitching vibration takes place to a greater extent than during acceleration or deceleration operations by the driver, and therefore ride comfort can be improved.

Furthermore, the priority level setting component 55 sets the priority level such that vehicle bouncing vibration of the vehicle is suppressed and vehicle pitching vibration is excited. Specifically, Kt_p and Ks_p are set to negative values. In so doing, nose diving that arises during steering takes place rapidly, and more stable turning performance is achieved. Also, pitching vibration can be achieved with stable turning performance. Also, because pitching vibration arises during driver acceleration and deceleration operations as well, the driver can better feel acceleration and deceleration. Additionally, pitching is not excited any more than necessary when driving on bad roads or the like, and impaired ride comfort performance can be prevented.

While the vehicle damping control apparatus has been described hereinabove in terms of its presently preferred embodiment, there are other possible configurations within the scope of the claimed invention. For example, while the embodiment showed a configuration provided with an engine which is an internal combustion engine as the drive power source of the braking/accelerating torque generating means, there is no limitation to an engine, and embodiment in a hybrid vehicle provided with a motor or in an electric car having a motor as the only drive power source is also possible.

Whereas in the configuration shown above, braking force is generated through pushing with brake pads by calipers provided as the braking actuators of the braking/accelerating torque generating means, the regenerative braking force of a motor or the like could be used as well. Also, there is no limitation to hydraulic brakes, and configurations provided with electrically actuated calipers or the like are also acceptable. In the case of an electric car provided with a motor generator, because the braking/accelerating torque generating means constitutes a motor generator, a signal which is a combination of both accelerating torque and braking torque may be output as the torque signal for presentation to this motor generator.

Whereas the embodiment showed a configuration in which a front/rear 2-wheel model having front and back suspensions on the body is used to calculate corrective torques for the purpose of suppressing pitching vibration and bouncing vibration of the vehicle, optionally, using a 4-wheel model, corrective torques for the purpose of suppressing roll vibration in addition to pitching vibration and bouncing vibration may be calculated.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle damping control apparatus comprising:
a braking/accelerating torque generating component configured to generate braking/accelerating torque in a wheel;
a corrective torque calculating component configured to calculate a corrective torque to suppress vehicle pitching vibration and vehicle bouncing vibration;
a corrective torque command value output component configured to output a corrective torque command value to the braking/accelerating torque generating component based on the corrective torque; and
a priority level setting component configured to set a priority level used in calculating the corrective torque command value such that the vehicle bouncing vibration is suppressed to a greater extent than the vehicle pitching vibration in the corrective torque command value.

2. The vehicle damping control apparatus according to claim 1, further comprising
a braking/accelerating torque sensing component configured to sense the braking/accelerating torque; and
a wheel velocity sensing component configured to sense wheel velocity;
the corrective torque calculating component including
a first corrective torque computing component configured to compute a first corrective torque to suppress the vehicle pitching vibration and the vehicle bouncing vibration based on the braking/accelerating torque; and
a second corrective torque computing component configured to compute a second corrective torque to suppress the vehicle pitching vibration and the vehicle bouncing vibration of the vehicle based on wheel velocity;
the corrective torque command value output component configured to compute a corrective torque command value based on the first corrective torque, the second corrective torque and the priority level; and
the priority level setting component sets the priority level in the first corrective torque such that the vehicle bouncing vibration is suppressed with priority in a higher amount over the vehicle pitching vibration, as compared with the priority level in the second corrective torque.

3. The vehicle damping control apparatus according to claim 1, wherein
the priority level setting component sets the priority level such that a priority level value is used in calculating the corrective torque command value in which the vehicle bouncing vibration is suppressed and such that the priority level value is used in calculating the corrective torque command value in which the vehicle pitching vibration is excited.

4. The vehicle damping control apparatus according to claim 2, wherein
the priority level setting component sets the priority level such that a priority level value is used in calculating the corrective torque command value in which the vehicle bouncing vibration is suppressed and such that the priority level value is used in calculating the corrective torque command value in which the vehicle pitching vibration is excited.

* * * * *